(12) United States Patent
Quagliaro

(10) Patent No.: US 6,831,610 B2
(45) Date of Patent: Dec. 14, 2004

(54) MODULAR ANTENNA SYSTEM

(75) Inventor: Gilles Quagliaro, Cormeilles-en-Parisis (FR)

(73) Assignee: Thales, Paris (FR)

( * ) Notice: Subject to any disclaimer, the term of this patent is extended or adjusted under 35 U.S.C. 154(b) by 73 days.

(21) Appl. No.: 10/408,660

(22) Filed: Apr. 8, 2003

(65) Prior Publication Data
US 2003/0214454 A1 Nov. 20, 2003

(30) Foreign Application Priority Data
Apr. 9, 2002 (FR) ............................................. 02 04405

(51) Int. Cl.$^7$ ................................................ H01Q 1/28
(52) U.S. Cl. ...................................... 343/705; 343/872
(58) Field of Search ................................. 343/705, 725, 343/872, 893; 455/12.1, 188.1, 427, 428, 430, 431

(56) References Cited

U.S. PATENT DOCUMENTS

| | | | |
|---|---|---|---|
| 5,678,171 A | 10/1997 | Toyama et al. | 455/3.2 |
| 6,023,245 A | 2/2000 | Gomez et al. | 343/725 |
| 6,195,060 B1 | 2/2001 | Spano et al. | 343/766 |
| 6,741,841 B1 * | 5/2004 | Mitchell | 455/188.1 |

FOREIGN PATENT DOCUMENTS

EP  1143556 A  10/2001

OTHER PUBLICATIONS

Richard J. Pankow: "Integrating a Radar/ESM Antenna Suite with the S–70 Helicopter" IEEE 1991, pp. 539–543.

A.C. Papavramidis, et al., "Adaptation of Land Mobile Systems for Onboard Operation", 1993 IEEE, pp. 258–263.

* cited by examiner

Primary Examiner—Hoang V. Nguyen
(74) Attorney, Agent, or Firm—Lowe Hauptman Gilman & Berner LLP.

(57) ABSTRACT

An antenna system comprises a Gatelink antenna (1), a Satcom Ku antenna (2), a Satcom Inmarsat antenna (3) positioned on a support that is mobile (5) in rotation and/or in translation and a device for the protection (6) of the antennas. Application to an airliner.

6 Claims, 2 Drawing Sheets

MODULAR ANTENNA SYSTEM

BACKGROUND OF THE INVENTION

The present invention relates especially to an integrated avionics modular antenna system, comprising at least two directional antennas capable of working in the different frequency bands $B_1$, $B_2$.

It can be applied more particularly to any mobile carrier equipped with several directional antennas working, for example, in different frequency ranges and having to be located in a limited amount of space. The carrier is, for example, a ship, an aircraft, or an automobile.

In mobile applications, the antenna preferably used is the dipole antenna, practical embodiments of which include whip antennas, quarter-wave antennas and antennas integrated into portable telephones. An antenna this kind has, for example, certain disadvantages. For example it is compact for frequencies higher than 1 GHz and almost omnidirectional, i.e. it does not require any aiming device.

However, the dipole antenna also has certain drawbacks. In particular, it is a source of pollution when sending signals (it sends a signal to all the receivers in addition to the useful receiver) and is indiscriminate in reception (it receives from all the transmitters in addition to the useful transmitter). Furthermore, owing to its small size, it has low sensitivity and requires high sending power. The dipole antenna thus contributes to wastage of frequency resources. It is easier to use directional antennas in fixed applications.

Growing needs in the field of radiocommunications are leading to the deployment of several radio systems on carriers. Each system has an antenna associated with it. The concentration of the antennas and their collocation in particular gives rise to a critical drop in performance. In the case of airliners, for example, the number and the disposition of present-day antennas rules out the installation of additional antennas in practice.

Today, for mobile applications, there are, for example, reserved bands enabling the use of antennas with low directivity. This is the case with the INMARSAT system, deployed in the L band, and the future AIRTV system, deployed in the S band. The frequency resources allocated to these systems nevertheless remain marginal and their capacithy is handicapped by the low selectivity of the antennas.

SUMMARY OF THE INVENTION

The object of the invention relates to an antenna system designed to be installed, for example, on a mobile carrier. This antenna system has at least two directional antennas working in different frequency domains.

The antenna system carries out the function of several antennas, for example the function of three directional antennas, in a volume and with ancillaries equivalent to those commonly needed for an antenna.

The object of the invention relates to an antenna system comprising at least three directional type antennas, a Gatelink antenna, a Satcom Ku antenna and a Satcom Inmarsat antenna, said antennas being positioned on a support that is mobile in rotation and/or in translation and a device for the protection of the antennas.

The antennas are protected, for example, by a radome.

It may furthermore comprise a GPS type antenna.

The invention also relates to a telecommunications system comprising at least one antenna system having one of the above-mentioned characteristics and at least one antenna-aiming device, linked with an inertial guidance unit as well as a transceiver.

The invention is used, for example, to equip the fuselage of an airliner.

The antenna system that is the object of the present invention offers especially the advantage of integrating several directional antennas in a small-sized system.

BRIEF DESCRIPTION OF THE DRAWINGS

Other features and advantages of the antenna system according to the invention will be seen more clearly from the description along with the appended figures, of which.

MORE DETAILED DESCRIPTION

To provide for a clearer understanding of the object of the present invention, the following description, given by way of an illustration that in no way restricts the scope of the invention, relates to an airliner equipped, for example, with an antenna system comprising at least three directional antennas. Each antenna is designed, for example, for a given application, such as the Inmarsat, Ku Band and Gatelink applications. The three applications work in three different frequency bands $F_1$, $F_2$, $F_3$ and the three antennas are not activated at the same time.

Figure 1:
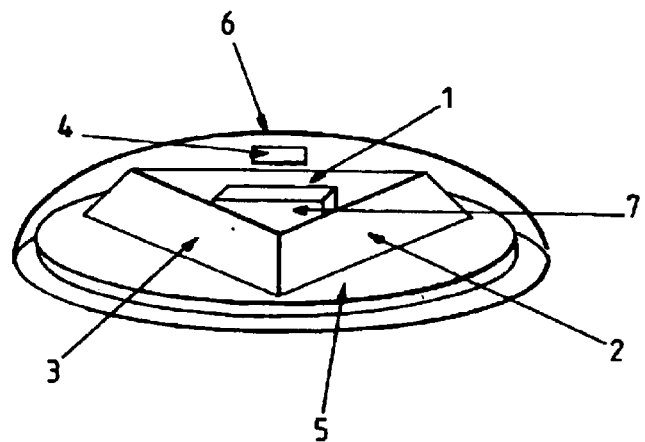
FIG. 1 shows an exemplary architecture of an antenna system according to the invention, ➤

FIG. 1 shows an exemplary integrated modular antenna system according to the invention, comprising a positioner 5 constituted for example by a motor-driven rotating plate. The positioner enables the antennas that it supports to be oriented on an axis in azimuth. It may be mobile in rotation and/or in translation. In this case, it is equipped with a device (not shown) that enables the performance of movements in rotation and translation. The three antennas cover, for example, the services for an airliner and are:

➤ A Gatelink antenna 1, frequency band $F_1$, providing an S band or C band radio bridge between the parked aircraft and the local area network of the airport. The Gatelink system is defined in the ARINC 763 specification.

➤ A SatCom Ku type antenna 2, working in the frequency band $F_2$, enabling DVB-S (Digital Video Broadcasting Satellite) reception from Astra or Hot Bird type satellites. This antenna may also provide a return channel in accordance with the DVB-RCS (Digital Video Broadcasting Return Channel via Satellite) system as defined in the ETSI EN 301 790 standard). This antenna 2 is associated, for example, with a mechanically swivelling support or else linked with a device enabling its electronic orientation in elevation (not shown for reasons of simplification). This station is, for example, similar to the LMES station defined in the ETSI EN 301 427 standard.

➤ A Satcom Inmarsat antenna 3, working in the frequency band $F_3$, providing a voice-data service, with satellites of the name. This antenna is standardized in the ARINC 741 and ARINC 761 specifications. Just as in the case of the Satcom Ku antenna 2, this antenna may be associated with a device enabling its mechanical swivelling or, again, it may be connected to a device that carries out an electronic orientation in elevation.

Devices used to obtain the mechanical or electronic orientation of the antennas are known to those skilled in the art and, as they are not the object of the invention, they shall not be described in detail.

➤ As an option, the support may also comprise a GPS (Global Positioning System) type antenna 4 installed so that it does not interfere with the other antennas. Such an antenna is almost omnidirectional.

The antenna system also comprises a radome 6 positioned so as to cover the totality of the antennas installed, so as to protect them. A radio unit 7, known to those skilled in the art, fulfils the functions of radio proximity with the different antennas. For example, it fulfils the power amplifier, low-noise amplification, filter and duplexer functions. This radio unit is, for example, optimized as a function of the implementation of the antennas in the antenna system.

The three antennas, Gatelink 1, Satcom Ku 2 and Inmarsat 3 are positioned, for example, in the clear, without facing objects, so that they send signals to the sides without interfering with each other, for example according to a scheme of the kind shown in FIG. 1. They form a triangle, with the radio unit 7 positioned at the center. In a configuration of this kind, they leave a shadow zone at the center of the antenna system. This is a shadow zone in which the GPS antenna is positioned. The customary precautions, known to those skilled in the art, for the implementation of the antennas, may be found partly in the ARINC 761 standard and are complied with.

The ancillaries needed for the working of the assembly, for example the supplies, the cooling etc. are not described in detail because they are not the object of the invention.

Figure 2:
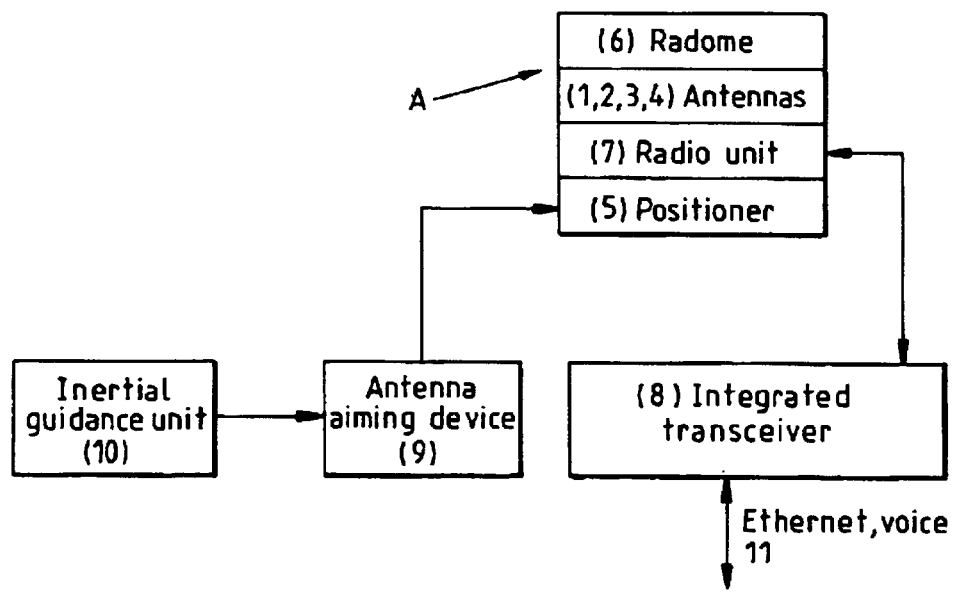
FIG. 2 is a complete block diagram, ➤

FIG. 2 is an exemplary block diagram of a telecommunications system installed on an airliner, for example, comprising the antenna system according to the invention, linked with the aircraft. A detailed description of the block diagram can be found in the ARINC 741 specification.

The antenna system, represented by the block A in the figure, receives a piece of aiming information delivered by an antenna aiming device 9 that is connected to an inertial guidance unit 10. An integrated transceiver 8, for example, is linked with a network 11 which is an Ethernet, voice or other type of network, and interfaces with the antenna system A.

The inertial guidance center 10 or any other adapted device is used especially to obtain the reading of the geographical position, the orientation and the altitude of the aircraft.

The antenna aiming device 9 drives the selection of the antenna and the orientation of the positioning device as a function, for example, of the position, orientation and altitude of the aircraft, communicated by the inertial guidance unit and, as a function, for example, of the direction, which is assumed to be known, of the requisite radio link. In the case of an airliner, the aiming device will activate, for example, the Gatelink antenna 1 if the aircraft is on the ground at the airport, the Satcom Ku antenna 2 if the aircraft is in flight above a continental zone served by a satellite Ku and the IMMARSAT antenna 3 if the aircraft is in flight over a maritime zone not served by a Ku satellite. The positions of the Ku and Inmarsat satellites are known with precision sufficient to enable a direct aiming of the antenna with the necessary precision. These positions are recorded, for example, in the memory of the antenna aiming device. An exemplary implementation of the aiming towards the INMARSAT satellites, transposable to the Ku satellites, is given in the ARINC 741 specification. On the ground at the airport, according to the same principle, the position and position of an aircraft in a parked position at an airport is known in advance and this data is stored in the memory of the aiming device with the information on the position of the radio access points at the airport. A system of acquisition through azimuthal scanning by the antenna can be implemented in stages if this data is not known or is obsolete.

The integrated transceiver 8 carries out, for example in one and the same piece of equipment, all the telecommunications functions associated with the invention. It is connected to the onboard network through given standard interfaces, such as the Ethernet, voice transmission, etc.

Figure 3:
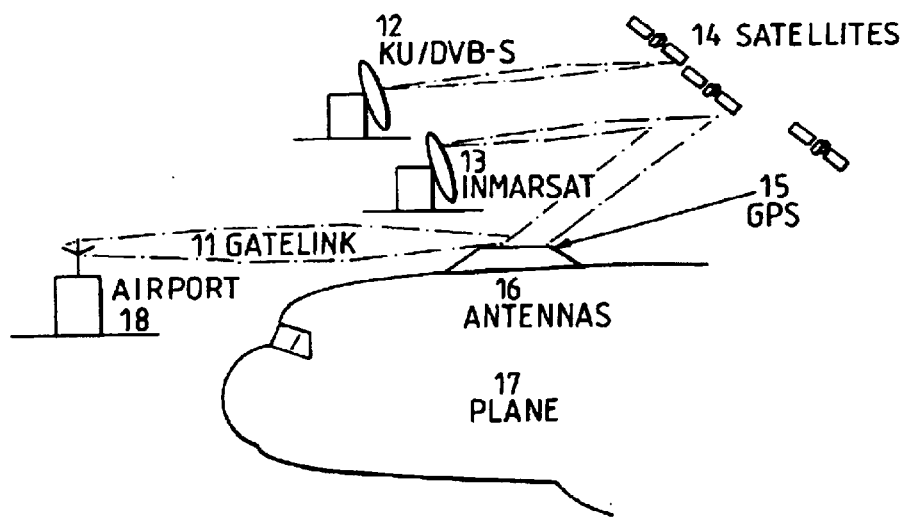
FIG. 3 shows an exemplary installation of the antenna system on an aircraft.

FIG. 3 gives a diagrammatic view of an installation, according to the invention, on an airliner. The antenna system referenced 16 is installed, for example, on the fuselage of the aircraft. The system enables the aircraft, in particular, to:

➤ Communicate with an airport, through the Gatelink application 11, standardized by the ARINC 763 specification, for example, ➤ Receive DVB-S television 12, in reception alone, or interactively, for example according to the DVB-RCS standard, ➤ Set up voice and low bit rate links through Inmarsat, 13, ➤ Read its position through the GPS system, 15.

➤ The last three services are provided, for example, by a satellite link 14.

What is claimed is:

1. An antenna system comprising at least three directional antennas, a Gatelink antenna, a Satcom Ku antenna and a Satcom Inmarsat antenna, said antennas being positioned on a support that is mobile in rotation and/or in translation, and a device for the protection of the antennas.

2. A system according to claim 1 wherein the protection device is a radome.

3. A system according to claim 1, comprising a GPS type antenna.

4. A system according to claim 1, wherein the three antennas, the Gatelink antenna, the Satcom Ku antenna and the Satcom Inmarsat antenna are arranged in a triangle.

5. The use of the system according to claim 1 on the fuselage of an aircraft.

6. A telecommunications system comprising at least one antenna system according to claim 1 and at least one antenna-aiming device, linked with an inertial guidance unit as well as a transceiver.

* * * * *